US008204315B2

(12) United States Patent
Madabhushi et al.

(10) Patent No.: US 8,204,315 B2
(45) Date of Patent: Jun. 19, 2012

(54) SYSTEMS AND METHODS FOR CLASSIFICATION OF BIOLOGICAL DATASETS

(75) Inventors: Anant Madabhushi, South Plainfield, NJ (US); Michael D. Feldman, Garnet Valley, PA (US); John E. Tomaszewski, Abington, PA (US); Mark Rosen, Bala Cynwyd, PA (US); Jianbo Shi, Philadelphia, PA (US)

(73) Assignees: The Trustees of the University of Pennsylvania, Philadelphia, PA (US); Rutgers, The State University of New Jersey, New Brunswick, NJ (US)

(*) Notice: Subject to any disclaimer, the term of this patent is extended or adjusted under 35 U.S.C. 154(b) by 1188 days.

(21) Appl. No.: 11/907,967

(22) Filed: Oct. 18, 2007

(65) Prior Publication Data

US 2008/0118124 A1 May 22, 2008

Related U.S. Application Data

(60) Provisional application No. 60/852,516, filed on Oct. 18, 2006.

(51) Int. Cl.
*G06K 9/62* (2006.01)
*G06K 9/00* (2006.01)

(52) U.S. Cl. ......... 382/224; 382/128; 382/159; 382/225

(58) Field of Classification Search .............. 382/159, 382/128, 224, 225
See application file for complete search history.

(56) References Cited

U.S. PATENT DOCUMENTS

| 2005/0027188 A1* | 2/2005 | Metaxas et al. ............... 600/410 |
| 2005/0100209 A1* | 5/2005 | Lewis et al. .................... 382/159 |
| 2006/0064248 A1* | 3/2006 | Saidi et al. ....................... 702/19 |

OTHER PUBLICATIONS

Madabhushi, A. et al., "Distinguishing Lesions from Posterior Acoustic Shadowing in Brerast Ultrasound via Non-Linear Dimensionality Reduction," EMBS Annual International Conference, Aug. 30-Sep. 3, 2006.*
Bauer, E. et al., "An Empirical Comparisonof Voting Classification Algorithms: Bagging, Boosting, and Variants," Mach. Learning, vol. 36, pp. 105-139, 1999.*
He, Z. et al., "A Fast Greedy Algorithm for Outlier Mining," Proc. of PAKDD, Apr. 9-12, 2006.*
Karkanis, S et al., "Classification of Endoscopic Images Based on Texture Spectrum," Workshop on Machine Learning in Medical Applications, Chania, Greece, pp. 5-16, 1999.*
Yan et al ("Graph embedding: a general framework for dimensionality reduction") CVPR'05, Jun. 2005.*
I. Dhillon, D. Modha, W. Spangler, "Class Visualization of high-dimensional data with applications", Computational Statistics & Data Analysis, 2002, vol. 41, pp. 59-90.
T. Iwata, K. Saito, et al., "Parametric Embedding for Class Visualization", NIPS, 2004.
A. Globerson, G. Chechik, et al., "Euclidean Embedding of Co-occurrence Data", NIPS, 2004.
H. Zhong, J. Shi and M. Visontai, Detecting Unusual Activity in Video, CVPR, 2004.

(Continued)

*Primary Examiner* — Anand Bhatnagar
*Assistant Examiner* — Soo Park
(74) *Attorney, Agent, or Firm* — RatnerPrestia (57) ABSTRACT

This invention relates to supervised or unsupervised classification of biological datasets. Specifically, the invention relates to the use of Graph Embedding as a method of reducing dimensionality thereby improving supervised classification of classes, both conventional and new ones.

29 Claims, 9 Drawing Sheets

OTHER PUBLICATIONS

A. Madabhushi, M. Feldman, D. Metaxas, J. Tomaszeweski, D. Chute, Automated Detection of Prostatic Adenocarcinoma from High Resolution in vitro prostate MR studies, IEEE Trans. Med. Imag., Accepted.

Pattern Classification and Scene Analysis (R. Duda, P. Hart, Eds.), New York Wiley, 1973.

, Principal Component Analysis, (T. Joliffe, Eds) Springer-Verlag, 1986.

* cited by examiner

SYSTEMS AND METHODS FOR CLASSIFICATION OF BIOLOGICAL DATASETS

CROSS REFERENCE TO RELATED APPLICATION

This application claims priority of U.S. Provisional patent application entitled "Systems and Methods for Automated Detection of Cancer", Ser. No. 60/852,516, filed Oct. 18, 2006.

FIELD OF INVENTION

This invention is directed to supervised or unsupervised classification of biological datasets. Specifically, the invention relates to the use of Graph Embedding as a method of reducing dimensionality thereby improving supervised classification of classes, both conventional and new ones.

BACKGROUND OF THE INVENTION

Detection and surgical treatment of the early stages of tissue malignancy are usually curative. In contrast, diagnosis and treatment in late stages often have deadly results. Likewise, proper classification of the various stages of cancer progression is imperative for efficient and effective treatment.

The aim of embedding algorithms is to construct low-dimensional feature-space embeddings of high-dimensional data sets. The low-dimensional representation is easier to visualize and helps provide easily interpretable representations of intra-class relationships, so that objects, which are closer to one another in the high dimensional ambient space, are mapped to nearby points in the embedded output.

In view of the above, there is a need for a sytematic medical decision support system capable of finding new classes within datasets which do not necessarily fit within conventional datasets.

SUMMARY OF THE INVENTION method of unsupervised or supervised classification of a biological dataset comprising the steps of: Obtaining a biological dataset, said biological dataset defining a scene Obtaining a prior distribution of a feature in a class, wherein each class is previously defined for the dataset; Computing a combined posterior likelihood that each feature belongs to the class; Using graph embedding (GEM), assigning each feature to an embedded space, wherein the assignment is based on the posterior likelihood; Partitioning the features in the embedded space to disjointed regions, thereby creating classes; and Generating new distribution for each feature in the new classes, whereupon comparison to the prior distribution classification is made.

Other features and advantages of the present invention will become apparent from the following detailed description examples and figures. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The application contains at least one drawing executed in color. Copies of this patent or patent application publication with color drawings will be provided by the Office upon request and payment of the necessary fee.

The invention will be better understood from a reading of the following detailed description taken in conjunction with the drawings in which like reference designators are used to designate like elements, and in which:

FIG. 3 shows (a) Original MR scene C, (b) surrogate of ground truth (in green) for cancer ($\hat{S}\omega_t$) superposed on (a), (c) combined likelihood scene showing tumor class probability before outlier refinement via embedding, (d) graph embedding of tumor/non-tumor class likelihoods in (c), (e) combined likelihood scene showing tumor class probabilities after outlier removal, (f) graph embedding of tumor/non-tumor class likelihoods in (e), (g) RGB representation of graph embeddings in (f), and (h) the histology slice corresponding to the MR slice in (a). Note the greater contrast between intensities in (e) compared to (c), reflecting the increased separation between the tumor and nontumor clusters after outlier removal. This is also reflected in the overlap of the tumor (red circles) and non-tumor (black dots) clusters in the embedding plot before outlier removal (ellipse 3 in (d)) and the more distinct separation of the two clusters after outlier removal (3(f)). Note that the objects that now occupy the overlap between class clusters (ellipse 3 in (f)), constitute the intermediate class (between tumor and non-tumor). Also note the tighter envelope of the prior distribution of feature $f_i$ (3(i)) after embedding (solid line) compared to before (dashed line). The embedding scene in 3(g) also reveals that an apparent false positive area (FP on 3(g)) actually corresponds to a new object class not included in the original classification (inflammation induced by atrophy, confirmed via the histology slice (h));

DETAILED DESCRIPTION OF THE INVENTION

This invention relates in one embodiment to supervised or unsupervised classification of biological datasets. Specifically, the invention relates to the use of Graph Embedding as a method of reducing dimensionality thereby improving supervised classification of classes, both conventional and new ones followed by generating an embedded scene map showing the resulting classes based reduced dimensionality in a color map that corresponds to the original dataset or image.

In one embodiment, provided herein is a novel application of graph embedding in improving the accuracy of supervised classification schemes, especially in cases where object class labels cannot be reliably ascertained, and in another embodiment, for identifying novel classes of objects not present in the original classification. In one embodiment, the methods described herein are successfully employed to improve the accuracy of a CAD system for detecting prostate cancer from high resolution MR images. In another embodiment, a new class (inflammation due to atrophy) are classified using the methods provided herein. In another embodiment, the method described herein are used to detect pre-cancerous lesions, the presence of which has significant clinical implications. In another embodiment, an RGB scene map is generated based on the embedded map, depicting the new class discovered as a discrete color region corresponding to the class location in the original image.

Figure 1:
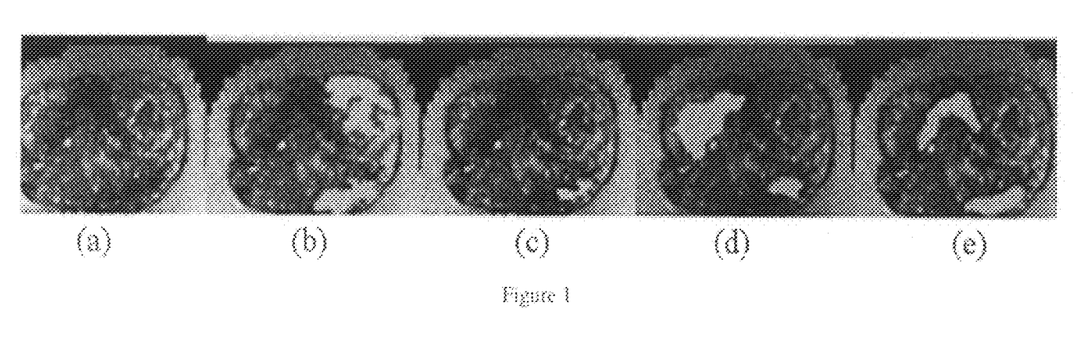
FIG. 1 shows (a) Original MR image of the prostate, (b) ground truth for tumor (in green) determined manually from the corresponding histology [5]. Three expert segmentations (FIG. 1(c)-(e)) based on visual inspection of FIG. 1(a) without the accompanying histologic information. Note the low levels of inter-expert agreement.
Figure 2:
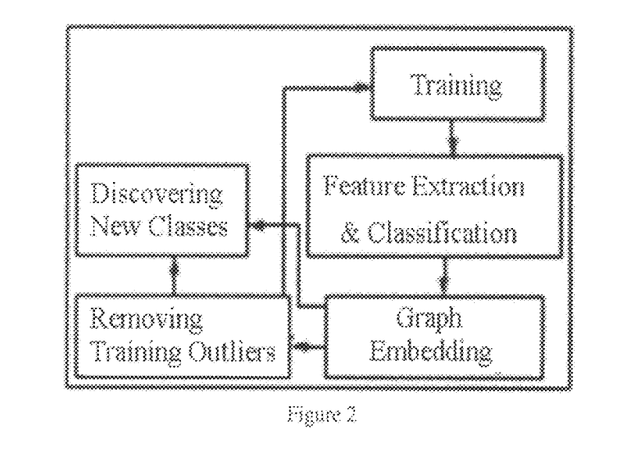
FIG. 2 shows an embodiment how the training distributions for individual features are generated using existing class labels, and in which each voxel assigned a posterior likelihood of being tumor. Graph embedding on the posterior likelihoods is used to remove training outliers and (i) improve the prior distributions and (ii) identify new classes.

In another embodiment, FIG. 2 shows an embodiment of the main modules and pathways comprising a system for performing the methods described herein.

Figure 5:
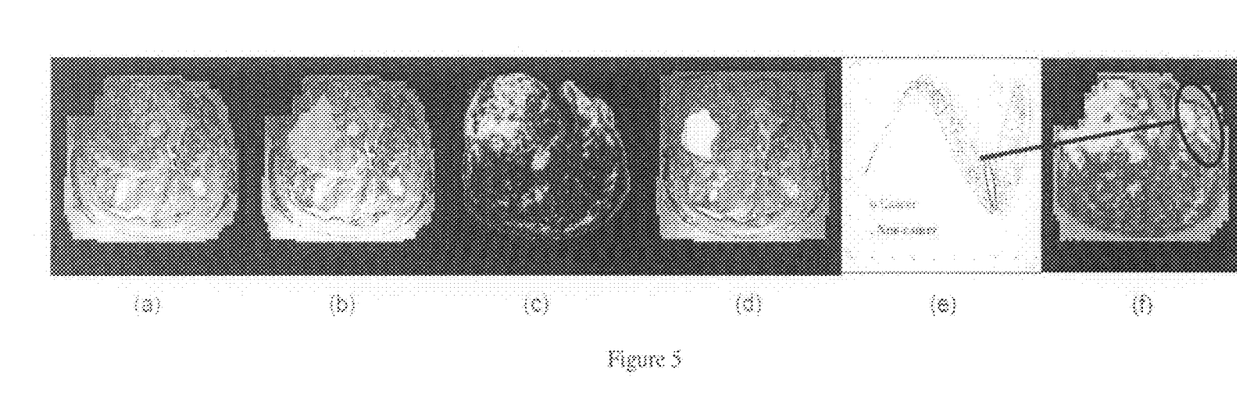
FIG. 5 shows (a), (e) Ex vivo prostate MRI, (b) tumor ground truth from histology, (c) CAD result, (d) superposition of 3 expert segmentations, (e) spectral clustering of image pixels in (a) a lower dimensional embedding space, and (f) spatial RGB representation of lower dimensional embedding coordinates of image pixels in (a). Ellipse in (b) shows the cluster representing the newly discovered class and its corresponding spatial location on (c)

In another embodiment, to detect novel classes, true outliers need to be eliminated due to human errors from a given training set (See FIG. 5(e)). In another embodiment, outlier removal from the training set significantly improves the accuracy of the original classification, and in one embodiment, the removal of outliers ensures that objects identified as image features, either a-priori or a-posteriori and that now lie in the overlap between the object classes following the outlier removal, truly represent the novel classes (middle ellipse in FIGS. 5(e), and 3(f)).

Accordingly and in one embodiment, provided herein is a method of unsupervised classification of a biological dataset comprising the steps of: obtaining a biological dataset, said biological dataset defining a scene (FIG. 5a); obtaining a prior distribution of a feature in a class, wherein each class is previously defined for the dataset; computing a combined posterior likelihood that each feature belongs to the class; using graph embedding (GEM), assigning each feature to an embedded space, wherein the assignment is based on the posterior likelihood; partitioning the features in the embedded space to disjointed regions, thereby creating classes; and generating new distribution for each feature in the new classes, whereupon comparison to the prior likelihood distribution, a classification is made.

In another embodiment, provided herein is a method of classifying prostate cancer tumors comprising the steps of: obtaining a; extracting two or more image features from an identified region; classifying the one or more image features; and analyzing class relationship between the image features, wherein if the a-posteriori likelihood that the image feature extracted is equal to, or greater than, an a-priori selected tumor class based on that image feature, then the extracted image feature belongs to that tumor class, otherwise, the extracted image feature belongs to a new class.

In one embodiment, Computer-aided detection (CAD), performed by the methods and systems described herein, refer to the use of computers to analyze medical images to detect anatomical abnormalities therein. In another embodiment, interchangeably with the term computer-aided detection are the terms computer-aided diagnosis, or computer-assisted diagnosis, or computer-assisted detection in other embodiments. In one embodiment, the outputs of CAD systems are sets of information sufficient to communicate the locations of anatomical abnormalities, or lesions, in a medical image, and in other embodiments, can include other information such as the type of lesion, degree of suspiciousness, and the like. CAD results communicated in one embodiment in the form of graphical annotations.

In one embodiment, the feature extracted from the biological datasets described herein and is classified and computed using the methods and systems described herein, is an image feature. In another embodiment, the feature is a statistical gradient feature, or a Haralick co-occurrence feature in another embodiment, or a Gabor feature in yet another embodiment. Other features may be extracted according to the needs of the prostate tissue for which the classification is sought.

In another embodiment, the feature extracted in the methods and systems described herein is a statistical feature. In another embodiment, the feature extracted is a Haralick co-occurrence feature. In another embodiment, the feature extracted is a Haar wavelet feature. In another embodiment, the feature extracted is a Gabor feature. In another embodiment, the feature extracted is calculated independently from each channel of a digitized image using a sliding window of 3×3 pixels, or in another embodiment, from 5×5 pixels, or in another embodiment, from 7×7 pixels. In one embodiment, the Haralick co-occurrence feature, which is a statistic feature extracted in the methods and systems described herein, is an angular second moment. In another embodiment, the Haralick co-occurrence feature is a contrast. In another embodiment, the Haralick co-occurrence feature is a correlation. In another embodiment, the Haralick co-occurrence feature is a variance. In another embodiment, the Haralick co-occurrence feature is an entropy. In another embodiment, the Haralick co-occurrence feature is an inverse difference moment. In another embodiment, the Haralick co-occurrence feature is a sum average. In another embodiment, the Haralick co-occurrence feature is a sum variance. In another embodiment, the Haralick co-occurrence feature is a sum entropy. In another embodiment, the Haralick co-occurrence feature is a difference variance, or a difference entropy in another embodiment.

In one embodiment, the Haralick co-occurrence describes texture in terms of the statistical distribution of the grayscale pixel values within an image, such as in a grayscale of a histological image used in the methods and systems described herein. In the analysis, let $s_1=(x_1, y_1)$ and $s_2=(x_2, y_2)$ be two pixels in the image, and let $s_1$ and $s_2$ be separated by a displacement of $d=(d_x, d_y)$ pixels so that $s2=(T_2, y_2)=(T_1+d_x, y_1+d_y)=s_1+d$ (2.5) For a fixed displacement d, statistical methods assume that the probability that $s_1$ and $s_2$ take on grayscale values of i and j, respectively, is governed by the joint probability mass function (PMF) P(i, j; d). It may equivalently reference the separation displacement between $s_1$ and $s_2$ by an absolute distance d and angle .theta. relative to the horizontal axis. The PMF of the spatial grayscale values becomes in this case P(i, j; d, θ).

Since the true grayscale distribution P(i, j; d, θ) is not known, it is estimated from empirical data. In another embodiment, Haralick accomplishes this with the so-called co-occurrence matrices. For an image I of size $N_x \times N_y$ with the set of distinct grayscale values G={1, 2, ..., $N_g$}, Haralick's method creates symmetric co-occurrence matrices P(i, j; d, θ) with i, jϵG specifying grayscale values, θϵ{0°, 45°, 90°, 135°} defining an angular direction and d representing the user-defined pixel distance. The (i, j) entry of P(i, j; d, θ) holds the total number of pixel pairs in the image, normalized by the total number of pixels in the image, with grayscale values i and j such that the two pixels in the pairs lie d pixels apart in the angular direction θ. [Robert M. Haralick, K. Shanmugam, and Its'Hak Dinstein. Textural features for image classification. IEEE Transactions on Systems, Man and Cybernetics, 3(6):610621, 1973]. Thus, for any specified d value, the method produces four co-occurrence matrices, one for each of the four θ values specified above. The value of d specifies the size of the neighborhood over which it is feasible to estimate the PMF of the grayscale distribution. In one embodiment, the resulting co-occurrence matrices serve as an estimate of the true grayscale distribution of the image.

The term "statistical gradient feature" refers in one embodiment to a-priori preselected substructures which are larger than a certain threshold value r chosen based on their statistically significant sub-structures statistic. That statistic is in one embodiment an average. In another embodiment, the statistic is a median. In another embodiment, the statistic is a standard deviation. In another embodiment, the statistic is a difference. In another embodiment, the statistic is a Sobel filter. In another embodiment, the statistic is a Kirsch filter. In another embodiment, the statistic is a horizontal derivative. In another embodiment, the statistic is a vertical derivative. In another embodiment, the statistic is a diagonal derivative of a pre-selected determinant. In another embodiment, the statistic is a combination of factors.

In one embodiment, the Gabor feature is the result of convolving the image used in the methods and systems described herein, with a bank of Gabor filters, generated by convolving a Gaussian function with a sinusoid at a range of scale and orientation parameter values. In another embodiment, the Gabor filters used in the methods and systems described herein, is a linear filter whose impulse response is defined by a harmonic function multiplied by a Gaussian function. In another embodiment, because of the multiplication-convolution property, the Fouriers transform of a Gabor filter's impulse response is the convolution of the Fourier transform of the harmonic function and the Fourier transform of the Gaussian function. In one embodiment, the term "convolution" refers to a mathematical operator which takes two functions f and g and produces a third function that represents the amount of overlap between f and a reversed and translated version of g. In another embodiment, convolution refers to a general moving average, by making one of the functions an indicator function of an interval.

In another embodiment, provided herein is a method of unsupervised classification of a biological dataset comprising the steps of: Obtaining a biological dataset, said biological dataset defining a scene Obtaining a prior distribution of a feature in a class, wherein each class is previously defined for the dataset; Computing a combined posterior likelihood that each feature belongs to the class; Using graph embedding (GEM), assigning each feature to an embedded space, wherein the assignment is based on the posterior likelihood; Partitioning the features in the embedded space to disjointed regions, thereby creating classes; and Generating new distribution for each feature in the new classes, whereupon comparison to the prior distribution classification is made, whereby the step of obtaining prior distribution is done using a training set of scenes and features. In another embodiment, the step of computing the combined posterior likelihood is preceded by the step of computing the posterior likelihood that each feature belongs to a given class.

In one embodiment, the step computing the posterior likelihood that each feature belongs to a given class done in the systems and methods described herein, is done using a Decision Tree algorithm. In another embodiment, computing the posterior likelihood is done using a Support Vector Machine algorithm. In another embodiment, computing the posterior likelihood is done using Bayes Decision Theorem. In another embodiment, computing the posterior likelihood is done using a combination.

In another embodiment, the step of computing the combined posterior likelihood that each feature belongs to a given class done in the systems and methods described herein is done using a standard ensemble method. In one embodiment, ensemble method refers to methods capable of producing bundled fits of data, by a stochastic algorithm, the output of which is some combination of a large number of passes through the dataset. Such methods are related in another embodiment, to iterative procedures in one embodiment and to bootstrap procedures in another. In one embodiment, the standard ensemble method is bagging. In another embodiment, the embodiment, the standard ensemble method is random forests. In another embodiment, the embodiment, the standard ensemble method is their combination.

Bagging as used herein, refers in one embodiment to "bootstrap aggregation" and comprises an algorithm. In one embodiment, the following bagging ensemble algorithm is used in fitting a biological data set having n observations and a binary response variable;

1. Take a random sample of size n with replacement from the data.
2. Construct a classification tree as usual but do not prune.
3. Repeat steps 1-2 a large number of times.
4. For each case in the data set, count the number of times over trees that it is classified in one category and the number of times over trees it is classified in the other category
5. Assign each case to a category by a majority vote over the set of trees.

In another embodiment of bagging, additional operation is introduced. At each step, observations not included in the bootstrap sample (referred to as "out-of-bag" data) are "dropped" down the tree. A record is kept of the class to which each out-of-bag observation is assigned. This information is used in another embodiment, to compute a more appropriate measure of the classification error, because it derives from the data not used to build the tree.

In one embodiment, random trees refers to the constructing a large number of trees from bootstrap samples of the biological data set. As each tree is constructed, a random sample of predictors is drawn before each class is split. For one embodiment, if there are ten predictor features, a random five predictors are chosen as candidates for defining the split. Then the best split is constructed, but selecting the features only from the five chosen. This process is repeated for each class. And, in one embodiment, as in bagging, no pruning is done. Thus, each tree is produced from of a random sample of scenes, and at each split a random sample of predictor features. Then classification is done by a majority vote of the full set of trees.

Figures 3A, 3C:
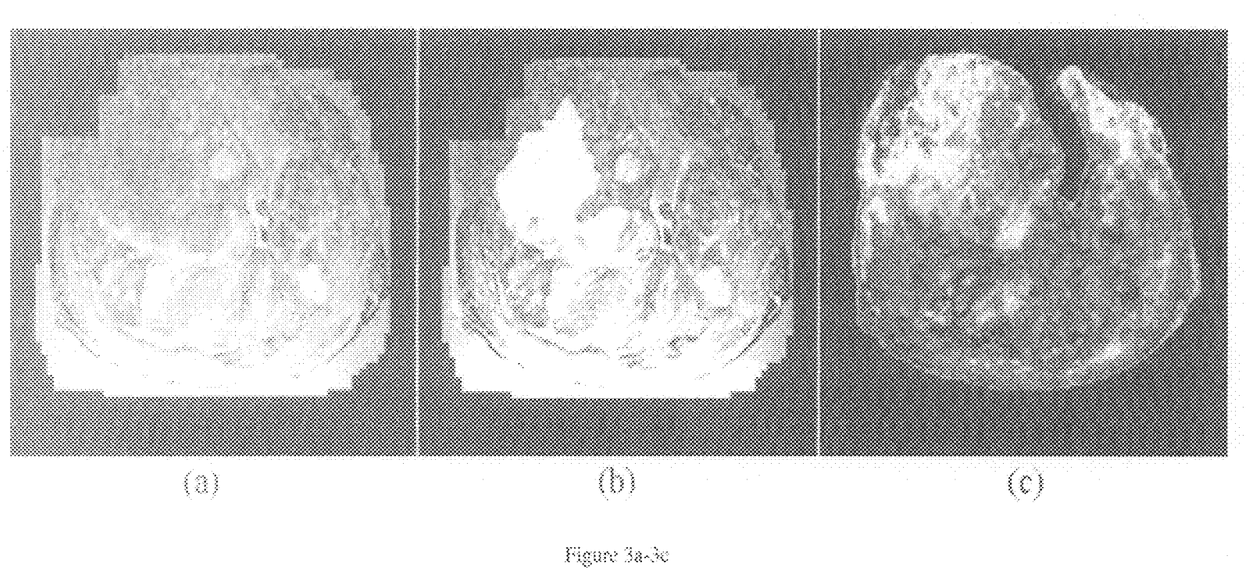
Figures 3A, 3B:
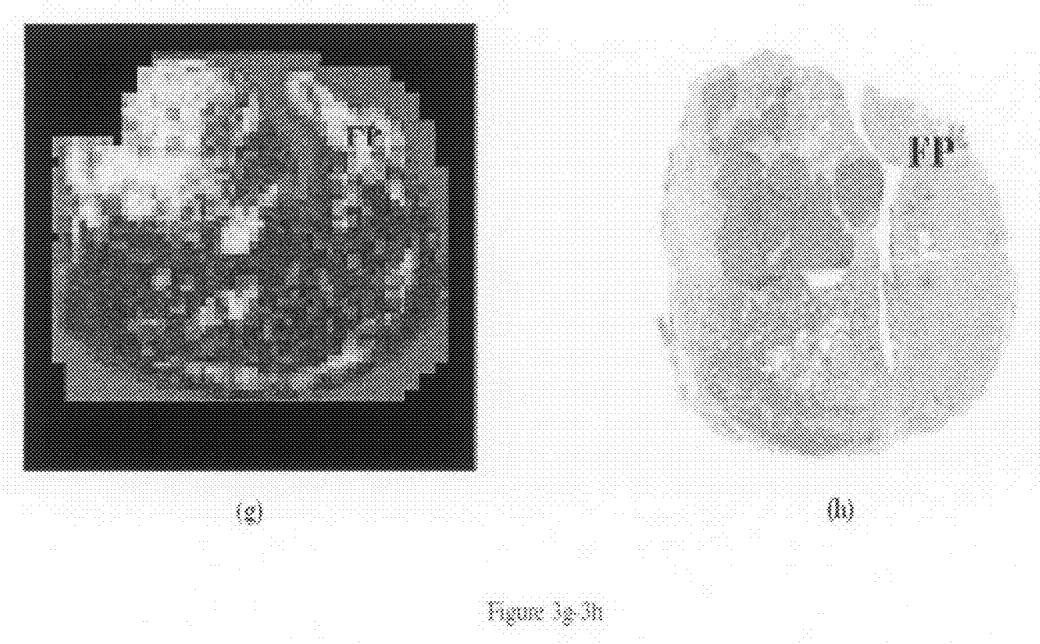
Figures 3D, 3F:
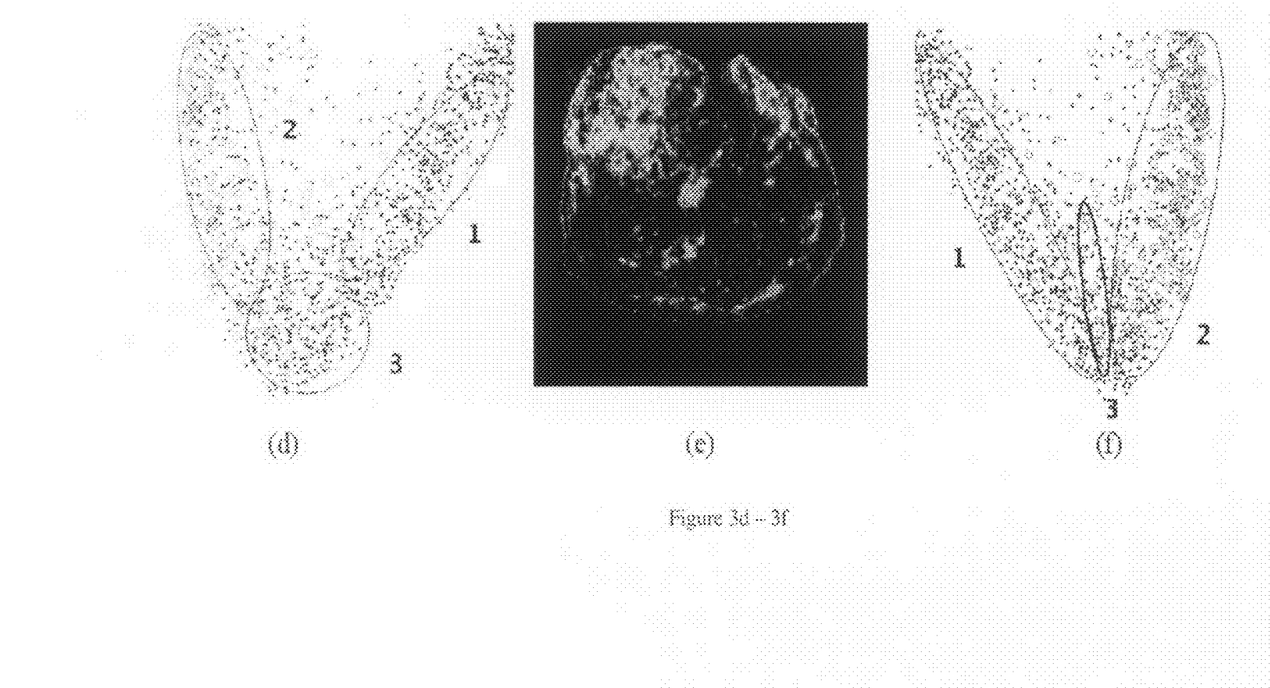
Figure 3I:
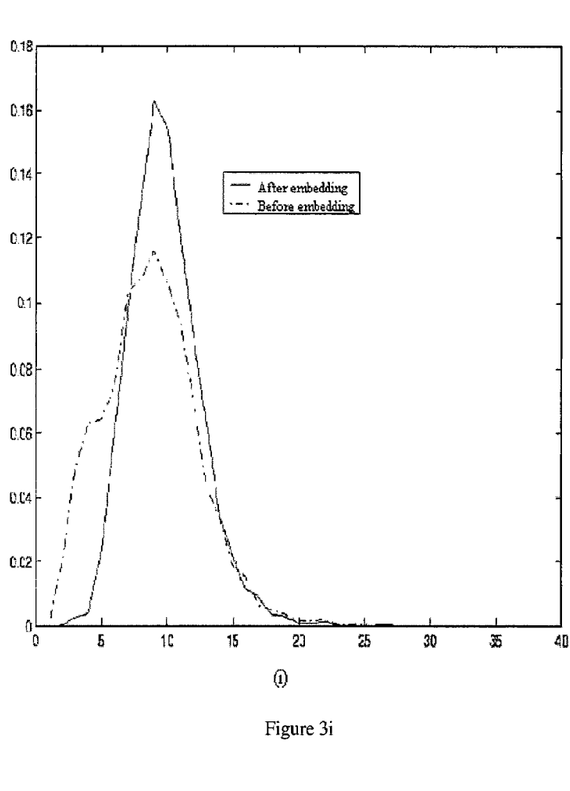

In another embodiment, the step of computing the combined posterior likelihood that each feature belongs to a given class done in the systems and methods described herein is done using a standard ensemble method and further comprises removing outliers from the dataset (See e.g. FIG. 3(f)).

In one embodiment, the methods described herein, which, in another embodiment, are carried out by the systems described herein, comprise a step whereby each feature is assigned to an embedded space, wherein the assignment is based on the posterior likelihood that each feature belongs to the class, using GEM, done by computing a confusion matrix for each class and solving for the smallest Eigen vector, wherein the rows of the Eigen vector are the coordinates for the class in the embedded space (See e.g. FIG. 5(e,f)).

Figure 6A:
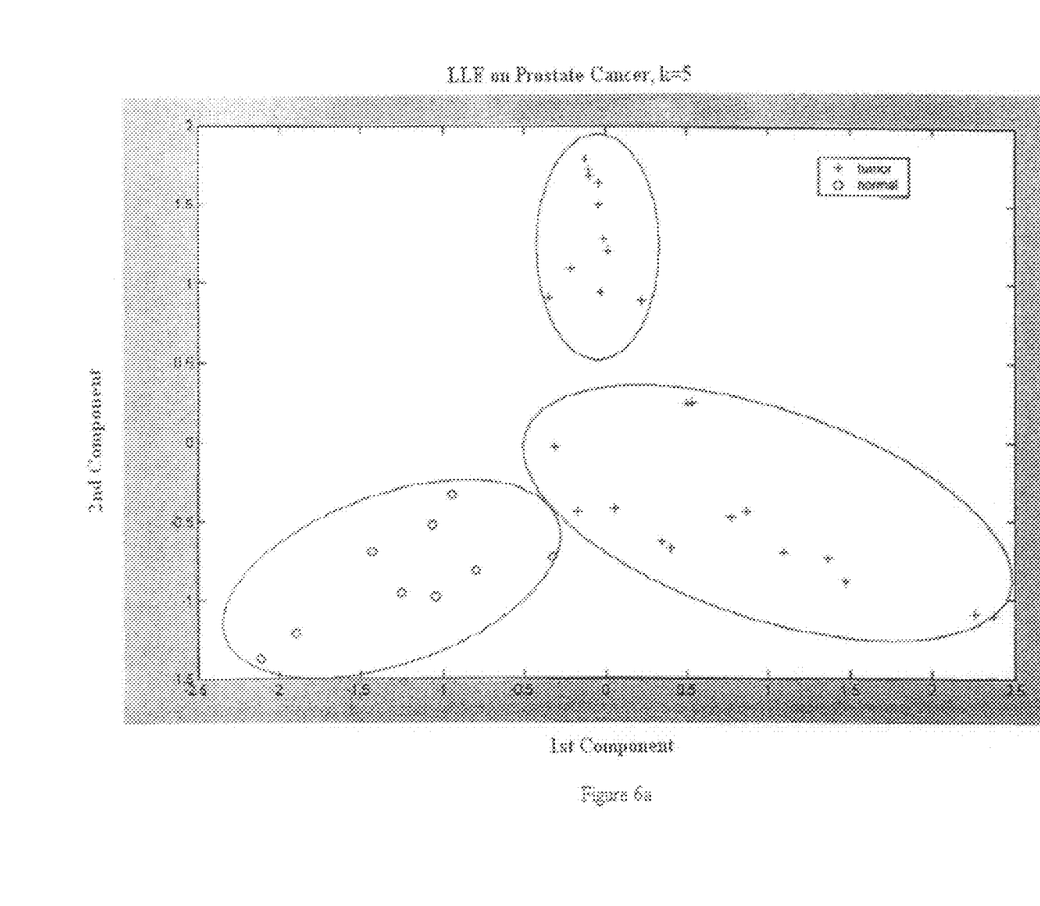
FIG. 6 shows (a) the classes identified by the methods provided herein using gene expression dataset; and (b) identification of a new sub class using the methods described herein.
Figure 6B:
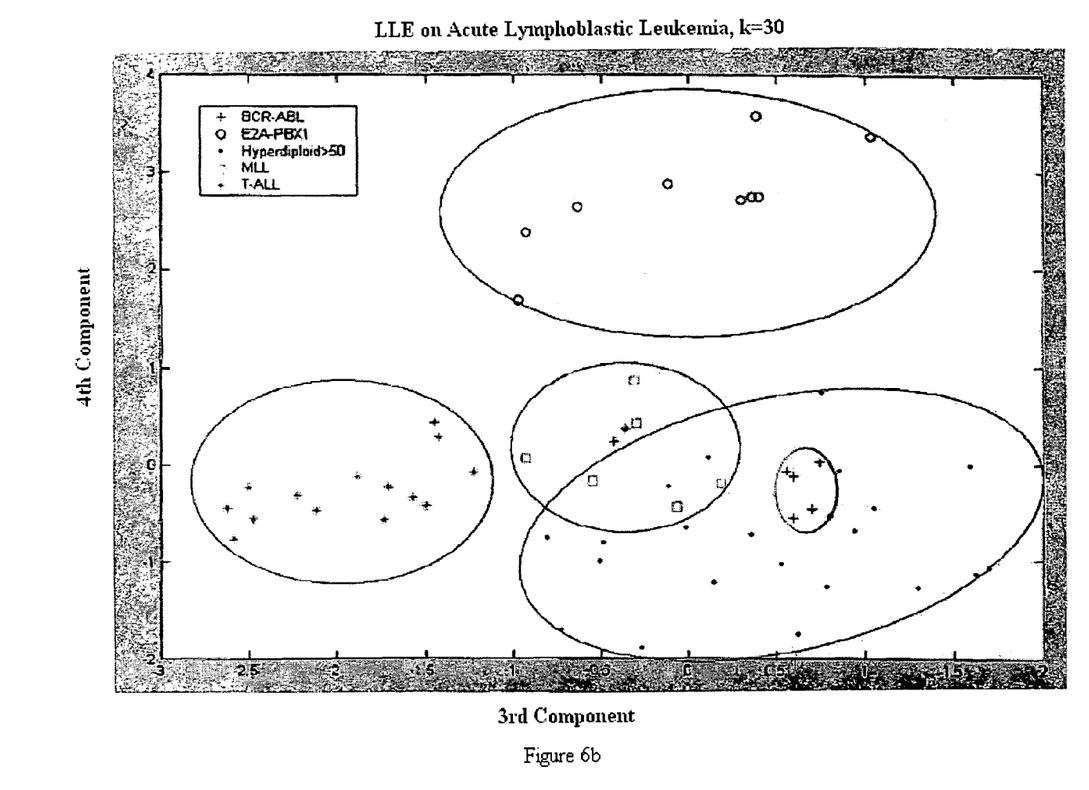

In one embodiment, the step of assigning each feature to an embedded space (See e.g. FIGS. 5(f), 3(g)), using graph embedding (GEM) to reduce the dimensionality of the features is done by computing a confusion matrix for each class and solving for the smallest Eigen vector, (See, e.g. FIGS. 5(e), 6(a) and 6(b)), wherein the rows of the Eigen vector are the coordinates for the feature in the embedded space. In another embodiment, spatial RGB representation of lower dimensional embedding coordinates of image pixels in the original dataset (See e.g. FIG. 5(a)). In one embodiment, the coordinates of the Eigen vectors are assigned a pseudocolor value, thereby generating a color scene map (See e.g. FIG. 5(e,f)), corresponding to the original image scene in one embodiment, or the original biological dataset.

In one embodiment, using radiology generated intensity images, does not allow the detection of pre-cancerous lesions in the imaged tissue, due to a single feature availability, i.e. intensity. In another embodiment, using a plurality of features, extracted from a plurality of biological datasets such as histopathology, MRS, MRI, radiology and the like taken for the same tissue; reducing their dimensionality using GEM and generating an embedded map scene, corresponding to the initial image, Ore-cancerous lesions are detected, classified and depicted as a discrete color (See e.g. green dots in FIG. 3(g) in one embodiment), are provided to the physician, using the methods and systems described herein.

In one embodiment, inflammation due to atrophy are difficult to classify based on radiology images alone, since the affected region appears as a cancerous lesion when based on intensity. In another embodiment, converting the image to a grayscale, followed by assigning pseudocolor to the grayscale, will not provide new information to the physician. In another embodiment, using the systems and methods described herein, an embedded map corresponding to the radiology image initially taken, which is based on a plurality of biological datasets, such as CT in one embodiment, in conjunction with either SPECT, MRS, MRI, MS Histopathology, their combination and the like, and using the GEM algorithms described herein, followed by concerting the embedded map to a color scene corresponding to the original image scene will detect and improve classification and differentiation between cancerous lesions and inflammation due to atrophy. In another embodiment the x,y, coordinate location of each feature in the embedded color scene map, corresponds to the feature's location in the original image. In another embodiment, color assignment is the same for all features belonging to the same class, based on their proximity with regard to the factors used to define the class in the ensemble methods used.

In another embodiment, provided herein is a method of unsupervised classification of a biological dataset comprising the steps of: obtaining a biological dataset, said biological dataset defining a scene; obtaining a prior distribution of a feature in a class, wherein each class is previously defined for the dataset; computing a combined posterior likelihood that each feature belongs to the class; using graph embedding (GEM), assigning each feature to an embedded space, wherein the assignment is based on the posterior likelihood; Partitioning the features in the embedded space to disjointed regions, thereby creating classes; and generating new distribution for each feature in the new classes, done in conjunction with generating new set of class objects, wherein the objects comprise a feature, and whereupon comparison to the prior likelihood distribution, a classification is made and in another embodiment, the step of generating new distribution for each feature in the new classes forms a new training set, which in yet another embodiment, may be used in the step of obtaining prior feature distribution according to the methods described herein.

In one embodiment, provided herein is a method of supervised classification of a biological dataset comprising the steps of: obtaining a biological dataset, said biological dataset defining a scene; obtaining a prior distribution of a feature in a class, wherein each class is previously defined for the dataset; computing a combined posterior likelihood that each feature belongs to the class; using graph embedding (GEM), assigning each feature to an embedded space, wherein the assignment is based on the posterior likelihood; Partitioning the features in the embedded space to disjointed regions, thereby creating classes; and generating new distribution for each feature in the new classes, done in conjunction with generating new set of class objects, wherein the objects comprise a feature, and whereupon comparison to the prior likelihood distribution, a classification is made and in another embodiment, the step of generating new distribution for each feature in the new classes forms a new training set, which in yet another embodiment, may be used in the step of obtaining prior feature distribution according to the methods described herein, and further comprising computing a new posterior likelihood that each feature belongs to an enumerated class and a combined posterior likelihood for the feature in the specific class. In one embodiment, the methods described herein are used iteratively on a large number of biological datasets.

In one embodiment, the feature extracted or used directly from the dataset in the methods and systems described herein, is calculated independently from each channel of the prostate image, such as an MR prostate image in one embodiment, using a sliding window of 3×3, 5×5, or 7×7 pixels. The average, median, standard deviation, and the range of f(c) is computed for all c∈C for each of the three color channels in the image, yielding 12 first-order statistical features. A co-occurrence matrix $Z \in \Re^{M \times M}$ is constructed for $C^R$ where $M=\max_{c \in C}|f(c)|$ is the maximum pixel value of C. The value in Z(f(b); f(c)) where b,c∈C is given by the number of times intensities f(b) and f(c) occur within a fixed displacement of each other at any orientation. Z is constructed for a displacement of 1, thereby generating a feature scene.

In one embodiment, the step of classifying the extracted region or regions from the prostate, or another dataset in another embodiment in the methods and systems described herein comprises the steps of creating a likelihood scene for the selected image; and creating a mask identifying regions of said selected image as benign or suspect by thresholding said likelihood scene at a value determined through system training, or in another embodiment manifold learning; and classifying the extracted region or regions as either benign, malignant, or suspect based on said mask.

The term "mask" refers in one embodiment to a technique for isolating the edges in an image, amplifying them, and then adding them back into the image. In another embodiment, the term "scene", or "likelihood scene" is used in the context of the recognition and localization of generic object classes in the image (or dataset) used in the methods and systems described herein. In another embodiment, a likelihood scene use a combination of a-priori selected image features in order to classify the extracted region according to whether it contains instances of a given object, such as a nucleus in one embodiment, or thickness of membranes, presence of legions and the like in other embodiments. In one embodiment, the likelihood scene is selected based on a decision tree algorithm, which, in another embodiment is the Adaboost classifier and is present as part of the systems described herein.

In one embodiment, the likelihood scene is selected based on a Support Vector Machine (SVM) algorithm. The term "Support Vector Machine algorithm" refers in one embodiment to a set of related learning methods used for classification and regression. In another embodiment, SVM algorithms simultaneously minimize the empirical classification error and maximize the geometric margin and are interchangeably as maximum margin classifiers in another embodiment.

In one embodiment, a graph embedding technique is used for improving classification accuracy and for novel class detection. In another embodiment the embedding algorithm takes as input the a-posteriori likelihoods of objects belonging to a class e.g. benign, malignant or suspect, or a tumor class in another embodiment. In one embodiment, the relationship between adjacent objects in the higher dimensional space is preserved in the co-embedded lower dimensional space when using graph embedding.

Graph Embedding (GEM) framework provides in one embodiment, an efficient infrastructure for data-centric information processing storage and classification by jointly addressing the issues of routing and mapping from data names of a-priori selected image features to classes.

In one embodiment, GEM refers to is a technique in graph theory in which a guest graph $\mathcal{G}$, is mapped into a host graph $\mathcal{H}$. In another embodiment, GEM refers to an embedding of the graph $\mathcal{G}$ (the guest graph), consisting of two mappings: (1) The class-assignment function $\alpha$ maps the set of classes in $\mathcal{G}$ one-to-one into the set of classes in $\mathcal{H}$. (2) The edge-routing function $\rho$ assigns to each edge $\{u, v\} \in E(\mathcal{G})$ a path in $\mathcal{H}$ that connects nodes $\alpha(u)$ and $\alpha(v)$.

In one embodiment, the labeled graph $\mathcal{G}$ enables classes to route image features efficiently from one classification label to another when each class only "knows" the image features assigned to its neighbors. Thus, in one embodiment, the classification labels implicitly contain information about the topology of the prostate image classified. In another embodiment, a function $f$ is developed, which that efficiently maps a key $k$ to a class in the class space $\mathcal{L}$. In one embodiment, the graph $\mathcal{G}$ is embedded into the topology $\mathcal{H}$ in a distributed manner, and without incurring unnecessary inaccuracies. In another embodiment the guest graph is able to route image features around failed classes, or dynamically reconstruct the graph embedding to repair the guest graph. In one embodiment, a function is created whereby image features routed around failed classes are classified as new classes.

In one embodiment, the metric used for graph embeddings used in the methods and systems described herein, is dilation, or congestion in another embodiment. In one embodiment, in dilation the edge-routing function $\rho$ to map the edges in $\mathcal{G}$ to paths that are as short as possible in $\mathcal{H}$. In one embodiment, each edge in $\mathcal{G}$ would simply be mapped to a corresponding edge in $\mathcal{H}$. However, in another embodiment, when the appropriate connection does not exist in $\mathcal{H}$, the edge must be simulated by a path. The congestion $c_e$ of edge $e \in E(\mathcal{H})$, refers in one embodiment to the sum of the weights of the paths incident on e. (In the unweighted case, this is just the number of paths that include e.) The congestion of the embedding is the maximum edge congestion taken over all edges in $\mathcal{H}$.

In one embodiment, the likelihood scene is determined by an Adaboost algorithm using Bayes Decision Theorem. In another embodiment, the likelihood scene is determined at least partially by an image feature extracted from one or more training images. In one embodiment, the term "AdaBoost" refers to adaptive boosting algorithm consisting of a class of concrete algorithms that is adaptive through forcing subsequent classifiers built to be tweaked in favor of those instances misclassified by previous classifiers. In another embodiment, for each measured feature in the extracted features of the histological images used in the methods and systems described herein, a distribution of weights $D_t$ is updated, indicating the importance of examples in the data set for the classification. On each iteration, the weights of each suspect classified example are increased (or in another embodiment, the weights of each benign or malignant classified example are decreased), so that the new classifier focuses more on those examples.

In one embodiment, provided herein is a method for analysis of a medical image, comprising: selecting a tissue sample image (See FIG. 3(a)), wherein said image comprises regions classified by creating a likelihood scene for the selected tissue image (3b); and creating a mask identifying regions of said selected image as benign or suspect by thresholding said likelihood scene at a value determined through system training (3c), or in another embodiment manifold learning; and classifying the extracted region or regions as either benign, malignant, or suspect based on said mask; identifying regions of said selected image classified as suspect; extracting an a-posteriori image feature from at least one of said identified regions; reducing the dimensionality of said extracted a-posteriori feature data; and classifying said selected image region as one of the group consisting of a cancerous tissue of a specific clinical stage of malignancy, a benign epithelium, and a benign stroma based on said at least one extracted image feature (3e). In another embodiment, the tissue is a prostate tissue, or in one embodiment, the gene expression profile of a cancerous tissue.

In one embodiment, the biological dataset used in the methods and systems described herein, is an imaging dataset, a spectroscopy dataset, a gene expression dataset, or a combination thereof. In another embodiment, the spectroscopy dataset is a mass-spectroscopy dataset or a magnetic resonance spectroscopy dataset. In one embodiment, whereby the imaging dataset is a magnetic resonance image dataset.

In one embodiment, when the dataset is an image dataset, the step of obtaining a prior distribution as effected using the methods and systems described herein, is preceded by a step of computing a feature scene for each feature in the scene.

In one embodiment, the methods described herein are performed using the systems described herein. Accordingly and in one embodiment, provided herein is a computerized system for performing the methods described herein, comprising: a feature extraction and classification module; a graph embedding module; and a class discovery module. In another embodiment, the system further comprises a module for removing outliers and a training model. In one embodiment, the systems described herein are operably linked to imaging systems, such as MRI system in one embodiment.

The skilled practitioner will readily recognize that embodiments described herein are applicable for a variety of medical imaging modalities such as computerized tomography (CT) imaging in one embodiment, or magnetic resonance imaging (MRI), positron emission tomography (PET), single-photon emission computed tomography (SPECT), and ultrasound in other distinct embodiments, and even less conventional medical imaging modalities such as thermography, electrical conductivity-based modalities, and the like in other discretely applicable embodiments.

The following examples are presented in order to more fully illustrate the preferred embodiments of the invention. They should in no way be construed, however, as limiting the broad scope of the invention.

EXAMPLES

Materials and Methods:
Notation

A 3D image or scene is represented by a pair $\mathcal{C}=(C, g)$, where C is a finite 3-dimensional rectangular array of voxels, and g is a function that assigns an integer intensity value g(c) for each voxel c∈C. The feature scenes $\mathcal{F}^i=(C, f^i)$ are obtained by application of K different feature operators, for $1 \leq i \leq K$. The tumor class is denoted by $\omega_t$, and $S_{\omega t}$ denotes the true ground truth set, such that for any voxel d∈$S_{\omega t}$, d→$\omega_t$ where denotes the "belongs to" relationship. $\hat{S}_{\omega t}$ is the surrogate of ground truth $S_{\omega t}$ obtained by experts by visually registering the MR and the histologic slices. $\hat{S}_{\omega t}^T \subset \hat{S}_{\omega t}$ is the training set used for generating the prior distributions $\hat{p}(f^i|C \to \omega_t)$ for each feature $f^i$. Given $\hat{p}(f^i|C \to \omega_t)$, the a-posteriori probability that voxel c→ωt for $f^i$ is given as $\hat{P}(C \mapsto \omega_t|f^i)$. $\hat{P}(C \mapsto \omega_t|F)$, for f=[$f^i$|i∈{1, . . . , K}], is the combined posterior likelihood obtained by combining $\hat{P}(C \mapsto \omega_t|f^i)$, for $1 \leq i \leq K$. $\tilde{p}(f^i|C \to \omega_t)$, $\tilde{P}(C \mapsto \omega_t|f^i)$, and $\tilde{P}(C \mapsto \omega_t|F)$ denote the corresponding prior, posterior, and combined posterior likelihoods obtained after refinement by embedding $\hat{L}=(C, \hat{l})$ denotes the combined likelihood scene (FIG. 3(d)), such that for c∈C, $\hat{l}(c)=\hat{P}(C \mapsto \omega_t|F)$. $\tilde{L}=(C, \tilde{l})$, where for c∈C, l(c)= $\tilde{P}(C \mapsto \omega_t|f^i)$, similarly denotes the corresponding likelihood scene (FIG. 3(e)) after refinement by graph embedding Feature Extraction and Classification A total of 35 3D texture feature scenes $\mathcal{F}^i=(C, f^i)$, for $1 \leq i \leq 35$, are obtained from the MR scene C. The extracted features include 7 first order statistical features at two scales, 8 Haralick features at two scales, 2 gradient features, and 18 Gabor features corresponding to 6 different scales and 3 different orientations. A more detailed description of the feature extraction methods has been previously presented. The a-posteriori likelihoods $\hat{P}(C \mapsto \omega_t|f^i)$ for each feature $f^i$ can be computed using Bayes Theorem as, $$\hat{P}(C \mapsto \omega_t | f^i) = \hat{P}(C \mapsto \omega_j) \frac{\hat{p}(f^i | C \mapsto \omega_j)}{\hat{p}(f^i)},$$

where $\hat{P}(c \to \omega j)$ is the a-priori probability of observing the class $\omega_j$, $$\hat{p}(f^i) = \sum_{j=1}^{B} \hat{p}(f^i | C \mapsto \omega_j)\hat{P}(C \mapsto \omega_j),$$

where $\mathcal{B}$ refers to the number of classes. The combined posterior likelihood $\hat{P}(C \mapsto \omega_j|F)$, for F=[$f^i$|i∈{1,...,K}], can be obtained from $\hat{P}(C \mapsto \omega_j|F)$, by using any of the various feature ensemble methods, e.g. ensemble averaging, GEM, majority voting.

Graph Embedding for Analyzing Class Relationships

The aim is to find a placement (embedding) vector $\hat{X}(c)$ for each voxel c∈C and the tumor class ωt such that the distance between c and class $\omega_t$ is monotonically related to the a-posteriori probability $\hat{P}(c \mapsto \omega|f)$ in a low-dimensional space. Hence if voxels c, d∈C both belong to class $\omega_t$, then [$\hat{X}(c)-$ $\hat{X}(d)]^2$ should be small. To compute the optimal embedding, a confusion matrix W is first defined, representing the similarity between any two objects c, d∈C in a high dimensional feature space.

$$W(c,d) = e^{-\|\hat{P}(c \mapsto \omega_t|f) - \hat{P}(d \mapsto \omega_t|f)\|} \in \mathfrak{R}^{|C| \times |C|} \quad (1)$$

Computing the embedding is equivalent to optimization of the following function, $$E_W(\hat{X}) = \frac{\sum_{(c,d) \in C} W(c, d)(\hat{X}(c) - \hat{X}(d))^2}{\sigma_{\hat{X}}^2}. \quad (2)$$

Expanding the numerator of (2) $2\hat{X}^T(D-W)\hat{X}$ is obtained, where $D(c, d) \in \mathfrak{R}^{|C| \times |C|}$ is a diagonal matrix with $D(c, c)=\Sigma_d W(c, d)$. Using the fact that:

$$\sigma_{\hat{X}}^2 = \sum_{c \in C} \hat{X}^2(c) \hat{P}(c \mapsto \omega_t | f) - \left(\sum_{c \in C} \hat{X}(c) \hat{P}(c \mapsto \omega_t | f)\right)^2, \quad (3)$$

it can be shown that $$\hat{P}(C \mapsto \omega_t | F) \approx \frac{1}{\gamma} D(c, c),$$

where γ=|C|−1, and |C| represents the cardinality of set C. Centering the embedding around zero (i.e. $\hat{X}^T\gamma=0$), we get $$\sigma_{\hat{X}}^2 = \frac{1}{\gamma} \hat{X}^T D\hat{X}.$$

Putting all these together we can rewrite (2) as, $$E_W(\hat{X}) = 2\gamma \frac{\hat{X}^T(D-W)\hat{X}}{\hat{X}^T D\hat{X}}. \quad (4)$$

The global energy minimum of this function is achieved by the eigenvector corresponding to the second smallest eigenvalue of, $$(D-W)\hat{X} = \lambda D\hat{X}. \quad (5)$$

For voxel c∈C, the embedding $\hat{X}(c)$ contains the coordinates of c in the embedding space and is given as, $\hat{X}(c)=$ [$\hat{e}_a(c)|a \in \{1,2, \ldots \beta\}$], where $\hat{e}_a(c)$, are the eigen values associated with c Improving Training Distributions by Refining Ground Truth In several classification tasks (especially in medical imaging), $S_{\omega t}$, the set of true ground truth class labels is not available. For the CAD problem tackled described herein, only an approximation of the ground truth ($\hat{S}_{\omega t}$) is available, so that there exist objects d∈$\hat{S}_{\omega t}$, which do not belong to class ωt. Consequently the prior distributions $\hat{p}(f^i|C \to \omega_t)$, for $1 \leq i \leq K$, and the posterior probabilities $\hat{P}(C \mapsto \omega_t|f^i)$ reflect the errors in $\hat{S}_{\omega t}$ since $\hat{p}(f^i|C \to \omega_t)$ is generated from a training set $\hat{S}_{\omega t}^T \subset \hat{S}_{\omega t}$. Clearly a more accurate estimate ($\tilde{S}_{\omega t}$) of $S_{\omega t}$ would result in more accurate prior distributions $\tilde{p}(C \mapsto \omega_t|f^i)$, for $1 \leq i \leq K$, and consequently a more accurate posterior likelihoods $\tilde{P}(C \mapsto \omega_t|f^i)$. To obtain $\tilde{S}_{\omega t}$ the following procedure was followed, (1) The embedding of all voxels c∈C, $\hat{X}(c)$ is determined. (2) The K-means algorithm is applied on the embedding coordinates $\hat{X}(c)$ to cluster objects c∈C into Z disjoint partitions {P1, P2, ..., PZ}. (3) The union of those disjoint partitions Pz, was obtained for 1≦z≦Z, sizes of which are above a pre-determined threshold θ. The rationale behind this is that outliers will be partitioned into small sets. $\tilde{S}_{\omega t}$ is then obtained as, $$\tilde{S}_{\omega_t} = \hat{S}_{\omega_t} \cap \left[\bigcup_z \mathcal{P}_z\right], \quad (6)$$

where $|\mathcal{P}_z| \geq \theta$, for $z \in \{1, 2, \ldots, Z\}$.

The intuition behind Equation 6 is that it only considers objects in $\hat{S}_{\omega t}$ for inclusion into $\tilde{S}_{\omega t}$. This avoids inclusion of potentially new outliers. Note that, since this procedure is only for the training step, there is no concern associated with including every object in class $\omega_t$ into $\tilde{S}_{\omega t}$. Instead, the aim is to ensure as far as possible that for every object c∈$\tilde{S}_{\omega t}$, c ↦ $\omega_t$. (4) New a-priori distributions $\tilde{p}(f^i|C \to \omega_t)$, for 1≦i≦K, are then generated from training set $\tilde{S}_{\omega t}^T \subset \tilde{S}_{\omega t}$ and the new posterior likelihoods $\tilde{P}(C \mapsto \omega_t|f^i)$ and combined likelihood $\tilde{P}(C \mapsto \omega_t|F)$, for f=[$f^i$|i∈{1, ..., K}], are computed.

FIG. 3(c), (e) correspond to the likelihood scenes ($\hat{L}$, $\tilde{L}$) obtained from distributions $\hat{p}(f^i|C \to \omega_t)$ and $\tilde{p}(f^i|C \to \omega_t)$ respectively. The intensity at every voxel c∈C in FIG. 3(c), (e) is given by the a-posteriori likelihoods $\hat{P}(C \mapsto \omega_t|F)$ and $\tilde{P}(C \mapsto \omega_t|F)$, for f=[$f^i$|i∈{1, ..., K}], respectively. While FIG. 3(e) is almost a bilevel image, suggesting distinct separation between the tumor and non-tumor classes, FIG. 3(c) is more fuzzy, indicating considerable overlap between the two classes. This is reflected in the plot of class embeddings $\hat{X}(c)$ obtained from $\hat{P}(C \mapsto \omega_t|F)$ in which considerable overlap (ellipse 3) exists between the two classes (FIG. 3(d)), while in the plot of $\tilde{X}(c)$, the graph embedding obtained from $\tilde{P}(C \mapsto \omega_t|F)$ (FIG. 3(f)), there is a more distinct separation of class clusters.

Discovering Novel Classes

Even after removing outliers from the ground truth, there exist objects that occupy the transition between tumor and non-tumor clusters (observe ellipse 3 in FIG. 3(f)), suggesting that the characteristics of these objects are between that of the tumor and benign classes. In FIG. 3(g) is shown a novel way of visualizing and identifying objects from these intermediate classes. Since $\tilde{X}(c)$ contains the embedding coordinates of voxel c, the embedding over scene C, $\tilde{X}(c)$ can be represented as a RGB image in which the value at voxel c is given by the three principal eigen values associated with c. Objects that are adjacent to each other in the embedding space have a similar color (FIG. 3(g)). The apparent false positive area (labeled as FP on FIG. 3(g)), on inspecting the corresponding histology slice (FIG. 3(h)) was found to be inflammation induced by atrophy on account of a prior needle insertion. This new class had not been considered in our original two class classification paradigm.

Algorithm

The following Algorithm is used:

---

$f^i$, the corresponding feature scenes for each feature was computed for each scene.
↓
Prior distributions $\hat{p}(f^i|C \to \omega_t)$ for each feature fi for class ωt are obtained using training set $\hat{S}_{\omega t}^T \subset \hat{S}_{\omega t}$.
↓
Bayes Theorem is used to compute posterior likelihoods $\hat{P}(C \mapsto \omega_t|f^i)$, for 1≦i≦K.
Combined likelihood $\hat{P}(C \mapsto \omega_t|F)$, for f = [$f^i$|i∈{1, ..,K}] is then computed from $\hat{P}(C \mapsto \omega_t|f^i)$ using any standard ensemble method.
↓
Confusion matrix W is computed for c, d∈C as W(c,d) = $e^{-\|\hat{P}(c \mapsto \omega^T|f) - \hat{P}(d \mapsto \omega_t|f)\|} \in \mathfrak{R}^{|C|\times|C|}$.
Solve for the smallest eigen vectors of $(D - W)\hat{X} = \lambda D \hat{X}$ where the rows of the eigen vectors are the coordinates for the object c in the embedding space $\hat{X}(c)$.
↓
Partition $\hat{X}(c)$ into disjoint regions $\mathcal{P}_z$, for 1≦z≦Z, and compute new set of tumor class objects $\tilde{S}_{\omega t} = \hat{S}_{\omega t} \cap [\cup_z P_z]$, where $|\mathcal{P}_z| \geq \theta$.
↓
Generate new prior distributions $\tilde{p}(f^i|C \to \omega_t)$, for 1≦i≦K, from new training set $\tilde{S}_{\omega t}^T \subset \tilde{S}_{\omega t}$ and compute new posterior likelihoods $\tilde{P}(C \mapsto \omega_t|f^i)$ and combined posterior likelihood $\tilde{P}(C \mapsto \omega_t|F)$, for f = [$f^i$|i∈{1, ..,K}].

---

Example 1

System Overview for Prostate Cancer Detection

FIG. 2 shows the main modules and pathways comprising the system. FIG. 3 shows the results of graph embedding on a high resolution MR study of the prostate (FIG. 3(a)). FIG. 3(c) is a map of the posterior likelihood of every voxel belonging to the tumor class; the posterior likelihood being derived from the prior distribution (dashed line in FIG. 3(f)), is obtained with the initial set of tumor class labels (FIG. 3(b)) and FIG. 3(e) shows the corresponding probability image using the refined prior distribution after graph embedding (solid line in FIG. 3(f)). The plot of graph embedding (FIG. 3(d)) shows considerable overlap (ellipse 3) between the tumor (red circles) and non-tumor (black dots) classes. Using the refined probability map in FIG. 3(e), the resultant embedding (FIG. 3(f)) shows a clear separation between the two classes (ellipses 1, 2). The increased class separation is also reflected in the increased image contrast of FIG. 3(e) over FIG. 3(c). FIG. 3(g) shows a novel way of visualizing the graph embeddings in FIG. 3(f), with objects that are adjacent in the embedding space being assigned similar colors. Objects that lie in the overlap of the class clusters after outlier removal (ellipse 3 in FIG. 3(f)) correspond to the apparent false positive area (marked as FP) in FIG. 3(g). This region is actually inflammation induced by atrophy (confirmed via the histology slice in FIG. 3(h)).

Example 2

Evaluating CAD Accuracy for Prostate Cancer on MRI

Figure 4:
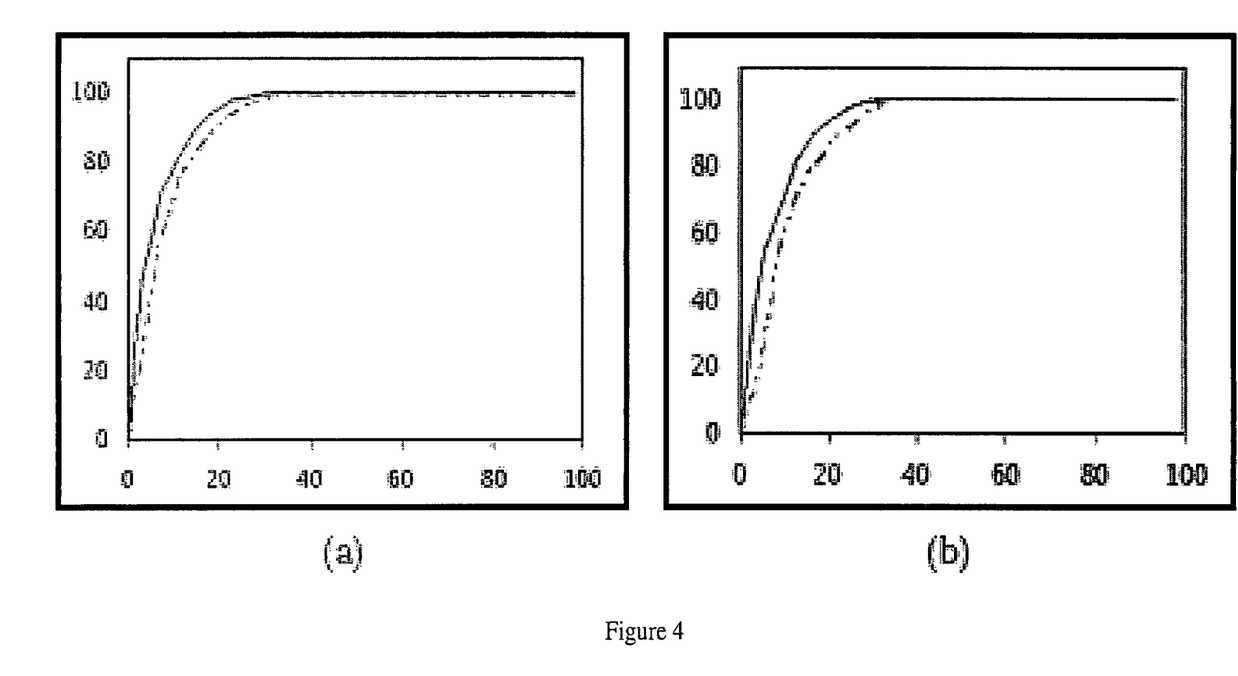
FIG. 4 shows ROC analysis of $\hat{L}$ (dashed line) and $\tilde{L}$ (solid line) using (a) ensemble averaging and 5 training samples, and (b) majority voting and 10 training samples.

The likelihood scene $\hat{L}$ is thresholded to obtain binary scene $\hat{L}_B$=(C,$\hat{l}$B) so that for c∈C, $\hat{l}_B(c)$=1 if $\hat{l}(c) \geq \delta$, where δ is a pre-determined threshold. $\tilde{L}_B$ is similarly obtained. $\hat{L}_B$ and $\tilde{L}_B$ are then compared with $\hat{S}_{\omega t}$ and $\tilde{S}_{\omega t}$ respectively to determine Sensitivity and Specificity values for different values of δ. Receiver operating characteristic (ROC) curves (plot of Sensitivity versus 100-Specificity) provide a means of comparing the performance of detection tasks. A larger area under the ROC curve implies higher accuracy. A total of 33 MR images of the prostate were used for quantitatively comparing $\mathcal{L}$ and $\hat{\mathcal{L}}$ for different values of δ. FIGS. 4(a) and (b) show the ROC curves for $\hat{\mathcal{L}}$ (dashed line) and $\mathcal{L}$ (solid line) for two different feature combination methods (ensemble averaging and majority voting) using 5 and 10 training samples respectively. The accuracy of $\mathcal{L}$ was found to be significantly higher compared to $\hat{\mathcal{L}}$ for both classification methods and different sets of training samples, as borne out by the larger area under the ROC curves in FIGS. 4(a) and (b). All differences were found to be statistically significant.

Example 3

Application to MRI Imaging Studies to Detect Pre-Malignant Lesions

FIG. 5 shows the comparison between the cancer likelihood images obtained via the applicants' supervised CAD model for CAP (5(c)) and human experts (5(d)) on a 4-T ex vivo MR image slice (5(a)) and compared to histological determined tumor ground truth (5(b)). Three different human expert segmentations, blinded to ground truth in 5(b) have been superposed on the same figure (5(d)). The bright areas on 5(c) are those determined by CAD to have high cancer likelihood, while bright areas on 5(d) represent areas where all 3 experts agreed cancer was present. Note that, (i) in spite of some false positive and false negative errors, CAD results (5(c)) are comparable to the expert segmentations and (ii) the low levels of inter-observer agreement (5(d)) FIG. 5(e) shows a cluster plot of all image pixels in FIG. 5(a) grouped together based on over 40 textural and intensity attributes. The embedding plot (5(e)) shows the presence of two distinct clusters corresponding to the benign (dots) and cancer (circles) classes that had been originally defined in the CAD paradigm and also a third cluster entrenched between the benign and cancer clusters Objects that lie in the overlap between the class clusters (thin ellipse in 5(e)) correspond to objects from intermediate classes FIG. 5(f) shows a novel way of visualizing the low dimensional embedding in (e) in which objects that are adjacent in the embedding space are assigned similar colors.

The method was able to detect a new histopathological class (inflammation induced by atrophy on account of a prior needle insertion and shown via an ellipse in 6(e), (f)). The finding allay apprehensions about biopsy changes masking tumor appearance on MRI.

Example 4

Detecting Cancer Subtypes in Cancer Genome Studies

The non-linear dimensionality reduction methods described in Examples 1-3, were used to analyze high dimensional cancer genome and gene expression studies in order to (i) detect presence of cancer sub-types and (ii) to distinguish relapse from non-relapse cancer patients who have all undergone cancer therapy. In the description below, for a high dimensional gene expression study of prostate cancer patients (21 patients, >13,000 genes, and 2 classes—benign and malignant), machine learning was able to correctly distinguish between patients (FIG. 6(a)) who have cancer versus (asterix) those who do not (circles). Further the algorithm described herein distinguishes between two groups of cancer patients as indicated by the two clusters with asterix strongly suggesting the presence of two distinct cancer subtypes in this population. The ability of the method to distinguish and identify cancer sub-types is confirmed for five classes of Acute Lymphoblastic Leukemia. After performing the dimensionality reduction, the graph (FIG. 6(b)) clearly reveals distinct disease sub-types (indicated by different symbols), The patients from different subtypes have been compactly grouped into the correct categories as shown by the different ellipses in the plot.

FIG. 6—The low dimensional embedding reveals (a) presence of distinct cancer sub types while analyzing high dimensional prostate cancer gene expression studies and also (b) correctly classifies 5 different sub-types of acute lymphoblastic leukemia Note that the different symbols in 6(a) and 6(b) indicate presence of different classes Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed:

1. A method of unsupervised classification of a biological dataset comprising the steps of:
   a. Obtaining a biological dataset, said biological dataset defining a scene;
   b. Obtaining a prior distribution of a feature in a class, wherein each class is previously defined for the dataset;
   c. Computing a combined posterior likelihood that each feature belongs to the class;
   d. Using graph embedding (GEM), assigning each feature to an embedded space, wherein the assignment is based on the combined posterior likelihood;
   e. Partitioning the features in the embedded space to disjointed regions, thereby creating new classes; and
   f. Generating a new distribution for each feature in the new classes, whereupon comparison to a prior likelihood distribution, a classification is made.

2. The method of claim 1, wherein the step of obtaining the prior distribution is done using a training set of scenes and features.

3. The method of claim 1, wherein the step of computing the combined posterior likelihood is preceded by the step of computing the combined posterior likelihood that each feature belongs to a given class.

4. The method of claim 3, wherein computing the combined posterior likelihood that each feature belongs to the given class is done using a Decision Tree algorithm, a Support Vector Machine algorithm, Bayes Decision Theorem, or their combination.

5. The method of claim 1, wherein the step of computing the combined posterior likelihood is done using a standard ensemble method.

6. The method of claim 5, wherein the standard ensemble method is bagging, random forests, or their combination.

7. The method of claim 5, further comprising removing outliers from the dataset.

8. The method of claim 1, wherein the step of assigning each feature to the embedded space using the graph embedding is done by computing a confusion matrix for each class and solving for a smallest Eigen vector, wherein rows of the Eigen vector are coordinates for the feature in the embedded space.

9. The method of claim 8, further comprising generating a scene map from the embedded space, wherein a color is assigned to each vector based on the coordinates obtained for the feature using a graph embedding dimensionality reduction and wherein a feature location in the embedded map corresponds to its location in an initial scene defined by the dataset.

10. The method of claim 1, wherein the step of partitioning the features in the embedded space is done in conjunction with generating a new set of class objects, wherein the class objects comprise a feature.

11. The method of claim 10, wherein the step of generating the new distribution for each feature in the new classes forms a new training set.

12. The method of claim 11, further comprising computing a new posterior likelihood that each feature belongs to an enumerated class and a combined posterior likelihood for the feature in the specific class.

13. A method of supervised classification of biological images comprising the step of repeating the method of claim 12 on a plurality of biological datasets.

14. A computerized system for performing the method of claim 13, comprising:
   a. a feature extraction and classification module;
   b. a graph embedding module; and
   c. a class discovery module.

15. The method of claim 1, wherein said feature is a statistical gradient feature, a Haralick co-occurrence feature, or a Gabor feature.

16. The method of claim 15, wherein said statistical gradient feature is a horizontal derivative, a vertical derivative, or a diagonal derivative of a pre-selected determinant.

17. The method of claim 15, wherein said Haralick co-occurrence feature is an angular second moment, a contrast, a correlation, a variance, an entropy, an inverse difference moment, a sum average, a sum variance, a sum entropy, a difference variance, or a difference entropy.

18. The method of claim 15, wherein said Gabor feature is the result of convolving an image with a bank of Gabor filters, generated by convolving a Gaussian function with a sinusoid at a range of scale and orientation parameter values.

19. The method of claim 1, wherein said feature is calculated independently from each channel of an image using a sliding window of 3×3, 5×5, or 7×7 pixels.

20. The method of claim 1, wherein the biological dataset is an imaging dataset, a spectroscopy dataset, a gene expression dataset, or a combination thereof.

21. The method of claim 20, wherein the imaging dataset is a magnetic resonance image dataset.

22. The method of claim 21, wherein the step of obtaining the prior distribution, is preceded by a step of computing a feature scene for each feature in the scene.

23. A method for analysis of an image sample, comprising:
   a. selecting an image of the image sample, wherein said image comprises regions classified by the methods of claim 22, the regions being classified as malignant, benign or suspect;
   b. identifying regions of said selected image classified as suspect;
   c. extracting an a-posteriori feature from at least one of said identified regions;
   d. reducing a dimensionality of said extracted a-posteriori feature; and
   e. reclassifying said identified regions of the selected image as one of the group consisting of a cancerous tissue of a specific clinical stage of malignancy.

24. The method of claim 23, wherein the step of reclassifying is followed by generating an embedded scene map based on Eigen vector coordinates, wherein each coordinate translates to a given color value.

25. The system of claim 14, further comprising a module for converting the class to a color embedded map.

26. The method of claim 20, wherein the spectroscopy dataset is a mass-spectroscopy dataset, a magnetic resonance spectroscopy dataset, a gene expression dataset, a protein expression dataset, or a histopathology dataset.

27. The method of claim 23, wherein the step of reducing the dimensionality of the extracted a-posteriori feature is done using graph embedding.

28. The system of claim 14, further comprising:
   a. a module for removing outliers; and
   b. a Training module.

29. The method of claim 23, wherein the image sample is of a prostate tissue.

* * * * *